United States Patent
Haines et al.

(10) Patent No.: US 6,396,653 B1
(45) Date of Patent: May 28, 2002

(54) APPARATUS AND METHOD FOR REDUCTION OF IDLE-MODE ACOUSTICS IN A DISC DRIVE

(75) Inventors: Jonathan Williams Haines, Lafayette; Frank William Bernett, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/536,437

(22) Filed: Mar. 27, 2000

Related U.S. Application Data
(60) Provisional application No. 60/137,751, filed on Jun. 4, 1999, and provisional application No. 60/140,863, filed on Jun. 24, 1999.

(51) Int. Cl.[7] .......................... G11B 21/02; G11B 21/08
(52) U.S. Cl. .................. 360/75; 360/78.04; 360/78.06; 360/78.07
(58) Field of Search .............................. 360/75, 78.04, 360/78.06, 78.07; 318/560, 561

(56) References Cited

U.S. PATENT DOCUMENTS

| | | |
|---|---|---|
| 4,937,689 A | 6/1990 | Seaver |
| 4,956,831 A | 9/1990 | Sarraf et al. ................. 369/32 |
| 5,291,110 A | 3/1994 | Andrews, Jr. et al. ...... 318/560 |
| 5,465,034 A | 11/1995 | Andrews, Jr. et al. ...... 318/560 |
| 5,657,179 A | 8/1997 | McKenzie ................ 360/78.06 |
| 5,668,680 A * | 9/1997 | Tremaine .................. 360/78.07 |
| 5,760,992 A | 6/1998 | Phan et al. ............... 360/78.07 |
| 5,781,373 A | 7/1998 | Larson et al. ............. 360/97.02 |
| 5,901,009 A | 5/1999 | Sri-Jayantha et al. .... 360/78.07 |

FOREIGN PATENT DOCUMENTS

| | | |
|---|---|---|
| WO | WO 88/02913 | 4/1988 |

* cited by examiner

*Primary Examiner*—David Hudspeth
*Assistant Examiner*—Dau I. Davidson
(74) *Attorney, Agent, or Firm*—John R. Wahl; Merchant & Gold P.C.

(57) ABSTRACT

An apparatus and method for minimizing audible noise in disc drives during idle periods uses a low-noise velocity profile and/or low noise position profile to govern the movement of a seeking actuator assembly. The low-noise velocity profile is selected to govern all actuator movement and seeking during idle periods, i.e., during internal drive housekeeping operations. The noise level associated with each actuator position in the drive is preferably determined through actual tests and/or modeling and is utilized to determine the low noise profiles. The relative amount of time the actuator assembly spends in the relatively noisier actuator assembly positions may also be optimally reduced thus reducing the overall amount of noise generated by an idle disc drive.

15 Claims, 5 Drawing Sheets

APPARATUS AND METHOD FOR REDUCTION OF IDLE-MODE ACOUSTICS IN A DISC DRIVE

RELATED APPLICATIONS

This application claims priority to provisional application Serial Nos. 60/137,751, filed Jun. 4, 1999, entitled "ALGORITHM FOR REDUCED SEEK ACOUSTICS IN IDLE DISC DRIVES" and Serial No. 60/140,863, filed Jun. 24, 1999, entitled "IDLE-MODE LOCATION-RELATED ACOUSTICS REDUCTION".

TECHNICAL FIELD

The invention relates generally to disc drives and specifically to reducing the acoustic noise generated when a disc drive undergoes a seek operation.

BACKGROUND

Disc drives are data storage devices that store digital data in magnetic form on a rotating storage medium on a disc. Modern disc drives comprise one or more rigid discs that are typically coated with a magnetizable medium and mounted on the hub of a spin motor for rotation at a constant high speed. Information is stored on the discs in a plurality of concentric circular tracks typically by transducers ("heads") mounted to an actuator assembly for movement of the heads relative to the discs. During a write operation, data is written onto the disc track and during a read operation the head senses the data previously written on the disc track and transfers the information to the external environment.

The heads are each mounted via flexures at the ends of actuator arms that project radially outward from the actuator body or "E" block. The actuator body typically pivots about a shaft mounted to the disc drive housing adjacent the outer extreme of the discs. The pivot shaft is parallel to the axis of rotation of the spin motor and the discs, so that the heads move in a plane parallel to the surfaces of the discs.

Typically, such actuator assemblies employ a voice coil motor to position the heads with respect to the disc surfaces. The voice coil motor typically includes a flat coil mounted horizontally on the side of the actuator body opposite the actuator arms. The coil is immersed in a vertical magnetic field of a magnetic circuit comprising one or more permanent magnets and vertically spaced apart magnetically permeable pole pieces. When a controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

The movement of the actuator so that the head moves from one position to another is called a "seek." Typically, a seek is controlled by a feed forward/feedback actuator servo control system. The DC current generated by the control system is derived from a velocity profile which governs how the actuator is accelerated from its initial position, the maximum velocity the actuator achieves and how the actuator is decelerated to complete its movement at the final position of the seek. Thus the attributes of the velocity profile determine the overall seek time. Typically, the acceleration rate, maximum velocity and deceleration rate in the velocity profile are the maximum allowable by the hardware in order to minimize the seek time. In a typical disc drive, there is only one velocity profile that governs actuator movement, regardless of whether the drive is idle, seeking in response to a user command or seeking in response to a command from some other source such as a network.

Disc drive seek operations create audible noise. The noise created is related to a number of factors including the overall seek speed, the specific attributes of the velocity profile and the disc rotating speed. Disc drive users recently have required higher data storage capacities and increased performance in drive designs resulting in faster seek times, faster disc rotation speeds, higher actuator assembly velocities and higher rates of acceleration and deceleration; all of which increase the audible noise from the drive.

The increased noise from disc drives has become a perceived problem in today's office environment by many users. Normally, the sound of a seeking disc drive is comforting to users when they have issued a save command or when they know the drive should be seeking. However, most disc drives today also perform seeks which are not initiated by the user during idle periods and when given network commands. Typical disc drives automatically perform self-diagnostic and maintenance seeks during idle periods and also seek to random positions to prevent the furrowing or migration of lubricant on the surfaces of the discs. The noise generated by seeks not initiated by a command from the user can be annoying to the user because most users do not understand why the drive is seeking. In fact, noise from idle period seeking and seeking due to commands unknown to the user have caused some users to believe that their drive is broken or malfunctioning.

SUMMARY OF THE INVENTION

Against this backdrop the present invention has been developed. It has been determined that audible seek noise can be reduced by slowing the seeking of the actuator arm, although during drive operation this not desirable because the users demand fast response to their commands. However, during periods when the drive is idle and awaiting commands from the user, minimizing the seek times is not a priority. Generally, most commands not initiated by the user do not require minimizing seek times. Also, it has been further determined that different actuator positions relative to the discs cause differing amounts of audible noise. In some cases the audible noise can vary up to 1 decibel (dB) between different actuator positions on the discs, which corresponds to a factor of 10 difference in the acoustic power generated depending on the actuator position. This noise is additional to the audible noise generated by the seeking of the actuator discussed above.

The method and apparatus in accordance with the present invention utilizes the two observations mentioned above to minimize audible noise generated by idle disc drives due to the seeking and position of the actuator. The method and apparatus also includes minimizing the audible noise for any seeking not initiated by the user.

Accordingly, an aspect of the invention is found in a method of minimizing audible seek noise in drive for any seeking not initiated by the user. This method includes a step of developing a low-noise velocity profile specifically designed to reduce the noise generated by movement of the actuator during seeking. This profile adjusts the acceleration, maximum velocity and deceleration to minimize the noise produced from the act of moving the actuator. Next, the low-noise velocity profile is selected during idle periods to govern all movement of the actuator. In addition, use of the low-noise velocity profile can be extended to all movement of the actuator not initiated by the user.

Another aspect of the invention is found in a method of minimizing audible noise in an idle disc drive using the observation that different actuator positions are relatively noisier than others. The method includes a step of rotating the actuator assembly to a plurality of actuator assembly positions. The actuator positions may correspond to tracks on the disc but this is not required. Next, a noise level associated with each actuator assembly position is determined and this information is used to adjust the drive operation during idle periods to minimize audible noise from the drive. In the present invention, the information is used in controlling actuator seeking and position selection during idle periods.

In one aspect of the invention, the noise level information is used during idle period seeking to adjust the velocity profile of the seek to minimize the overall noise generated by the seek. This is done by including the position noise as a part of a function that describes the overall noise created by seeking from one position to another and includes the noise generated by the act of accelerating, moving and decelerating the actuator based on the velocity profile.

Solving the function for a minimum produces a velocity profile that minimizes the overall noise generated during the seek.

In another aspect of the invention, the noise level of each position is used to determine what actuator positions are used and how long the actuator spends in each position during idle periods. One alternate method includes determining a set of actuator positions that are the least noisy, and using only positions from that set during idle periods, selecting from that set randomly or by some other method. The preferred method includes randomly selecting actuator positions during idle periods from the range of all possible positions, and adjusting the duration that the actuator is placed in the selected position based on the determined noise level of that position such that the amount of time the actuator arm assembly spends in the relatively noisier actuator positions is reduced.

These and other features as well as advantages that characterize the present invention will be apparent from a reading of the following detailed description and a review of the associated drawings.

DETAILED DESCRIPTION OF THE PREFERRED EMBODIMENTS

Figure 1:
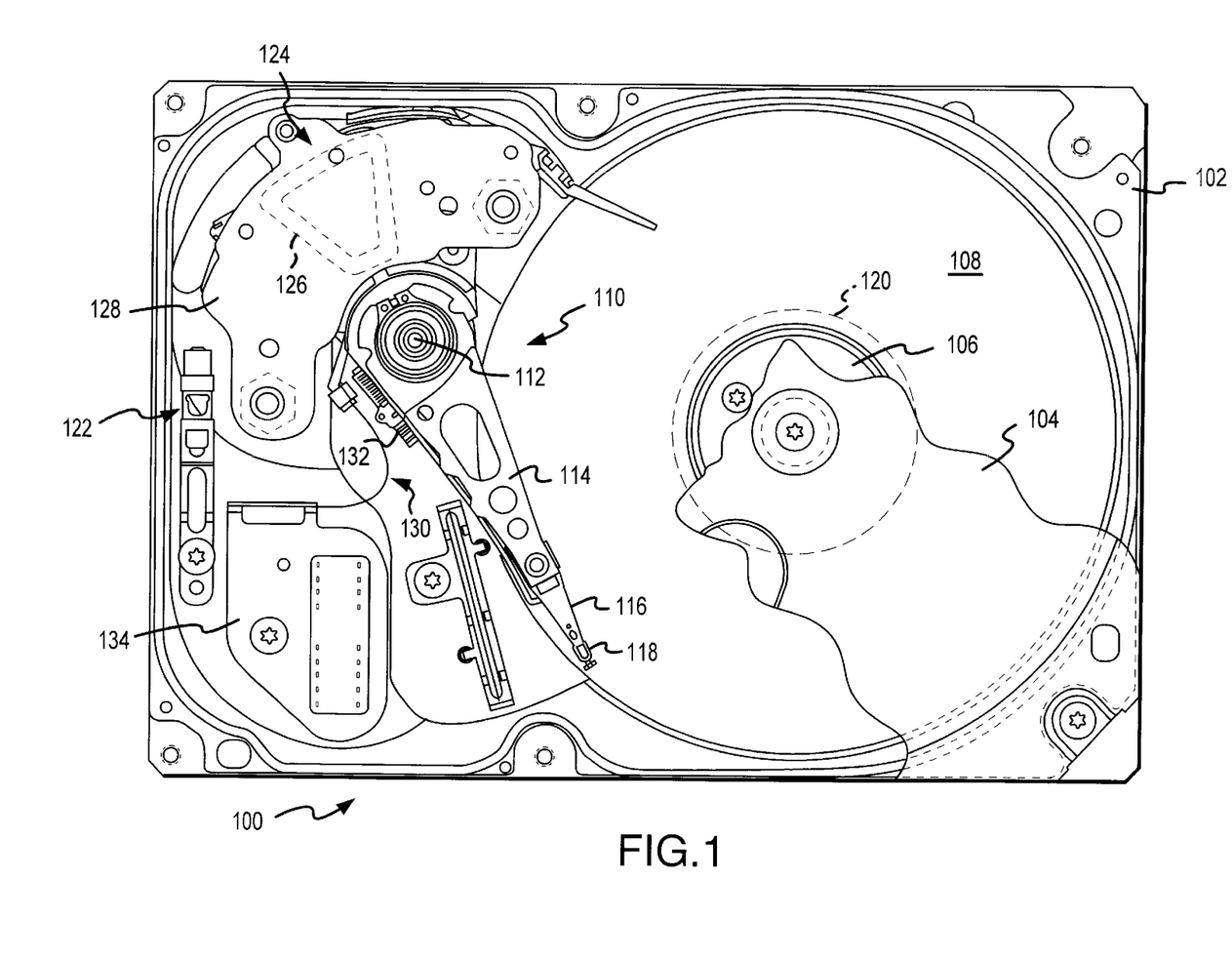
FIG. 1 is a plan view of a disc drive incorporating a preferred embodiment of the present invention with the disc drive cover partially removed.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA). The components include a spin motor 106 which rotates one or more discs 108 at a constant high speed. Information is written to and read from tracks on the discs 108 through the use of an actuator assembly 110, which rotates about a bearing shaft assembly 112 positioned adjacent the discs 108.

The actuator assembly 110 includes a plurality of actuator arms 114 which extend over the surfaces of the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spin motor 106 is typically de-energized when the disc drive 100 is not in use for extended periods of time. At such times, the heads 118 are moved over park zones 120 near the inner diameter of the discs 108 when the drive motor is de-energized. The heads 118 are secured over the park zones 120 through the use of an actuator latch arrangement 122, which prevents inadvertent rotation of the actuator arms 114 when the heads are parked.

The radial position of the heads 118 is controlled through the use of a voice coil motor (VCM) 124, which typically includes a coil 126 attached to the actuator assembly 110, as well as one or more permanent magnets and return plates 128 which are spaced apart and establish a vertical magnetic field between them in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes servo controller circuitry, including a microprocessor and memory for control software for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
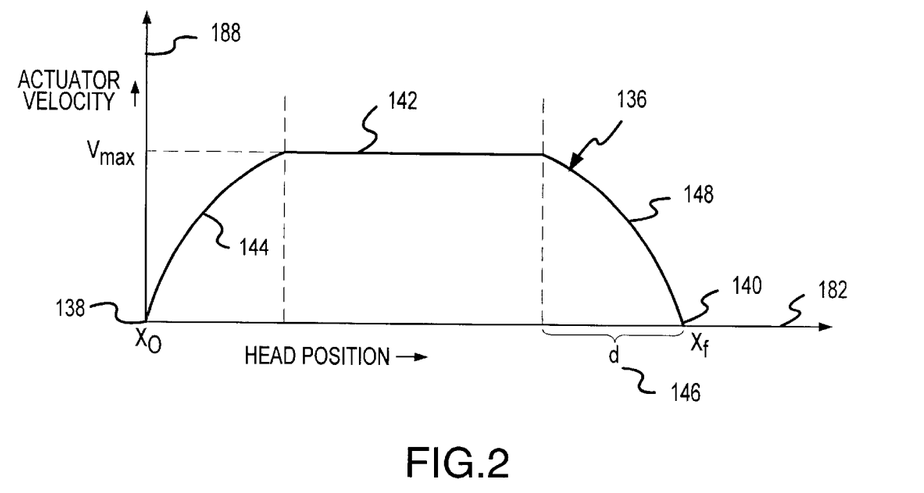
FIG. 2 illustrates a typical velocity profile utilized for a seek operation in a disc drive.

FIG. 2 illustrates a typical velocity profile 136 for a typical seek wherein the actuator assembly position 182 is plotted on the abscissa and the velocity 188 of the actuator assembly 110 measured at the head 118 is plotted on the ordinate. The profile 136 illustrates the velocity of the actuator assembly 110 at any given position as it seeks from an initial position ($x_0$) 138 to a final position ($x_f$) 140. The actuator assembly 110, starting at the initial position ($x_0$) is accelerated from that position to a maximum velocity ($V_{max}$) 142 at a predetermined rate as shown by the acceleration portion 144 of the profile 136. Then the actuator assembly 110 is moved at the maximum velocity 142 until the assembly reaches a predetermined distance 146, (d), away from the final position 140. Then the actuator assembly 110 is decelerated in accordance with the deceleration portion 148 of the velocity profile 136 so that the assembly comes to rest with the head 118 at the final position 140. Typically, the acceleration portion 144 is the maximum acceleration achievable by actuator assembly 110. Similarly, the maximum velocity 142 is typically dictated by the maximum velocity achievable by the actuator assembly 110.

A significant amount of research has been devoted to optimizing the velocity profile 136. A velocity profile 136 can be a mathematical function or a series of lookup tables and often is some combination of both. The focus of developing such profiles is minimizing total seek time or minimizing the seek time while meeting some additional performance criteria such as seek precision, reproducibility or maximum allowable acoustic noise.

A preferred embodiment of the present invention involves the servo control system using one or more alternate velocity profiles, in addition to a typical minimum seek time velocity profile 136 described above, and includes a means for storing all the profiles and a means for selecting a stored profile based on the source of the seek command.

Figure 3:
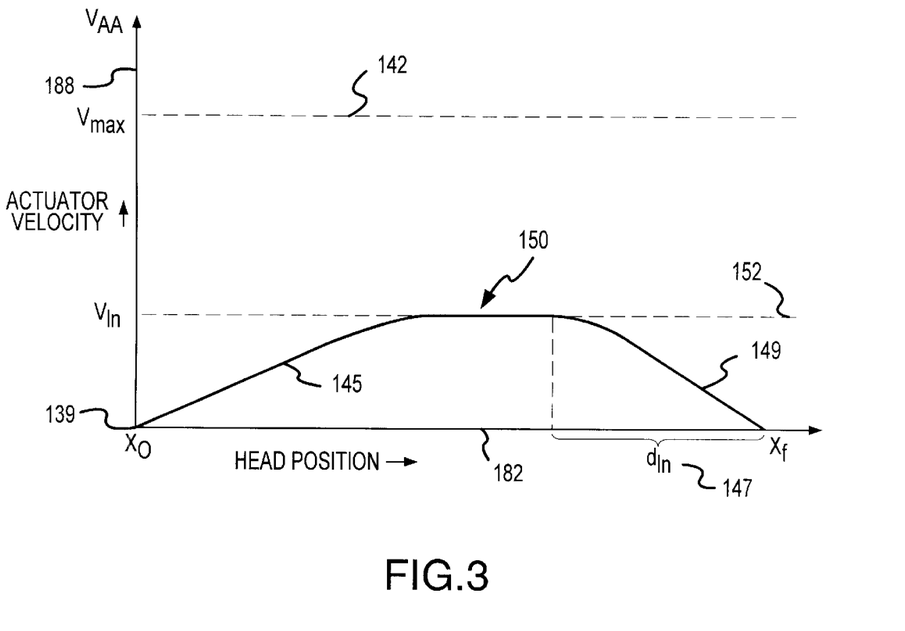
FIG. 3 illustrates a low-noise velocity profile for a seek operation during idle periods in accordance with a preferred embodiment of the present invention.

More particularly the preferred embodiment includes the development of a low-noise velocity profile 150 such as is shown in FIG. 3 in addition to a typical minimum seek time velocity profile 136 described above. The low-noise velocity profile 150 differs from the typical profile 136 in that its primary purpose is to achieve a low audible noise specification at the expense of total seek time. As in FIG. 2, the actuator assembly position 182 is plotted on the abscissa and the velocity of the actuator measured at the head 118 is plotted on the ordinate. The profile 150 again illustrates the velocity of the actuator assembly 110 at any given position as it seeks from an initial position ($x_0$) 139 to a final position ($x_f$) 141.

The actuator assembly 110, starting at the initial position of $x_0$ 139, is smoothly accelerated from that position to a predetermined low-noise velocity ($V_{ln}$) 152 (which is less that the maximum velocity 142) at a predetermined rate as shown in the acceleration portion 145 of the profile 150. Then the actuator assembly 110 is moved at the low-noise velocity 152, until the assembly reaches a predetermined distance ($d_{ln}$) 147 from the final position 141. Upon reaching that distance 147, the actuator assembly 110 is decelerated in accordance with the deceleration portion 149 of the velocity profile 150 so that the assembly comes to rest with the head 118 at the final position 141.

The low-noise velocity profile 150 may be determined through many different methods such as drive testing, arbitrary selection of a low-noise velocity 152 or reductions in acceleration and deceleration rates, or velocity profile modeling. The low-noise velocity profile 150 is determined through direct testing in the preferred embodiment by measuring the audible noise produced during seeks while varying the profile attributes. Note that minimizing the total seek time is not a prime factor in determining the low-noise velocity profile 150 in the preferred embodiment discussed.

Figure 4:
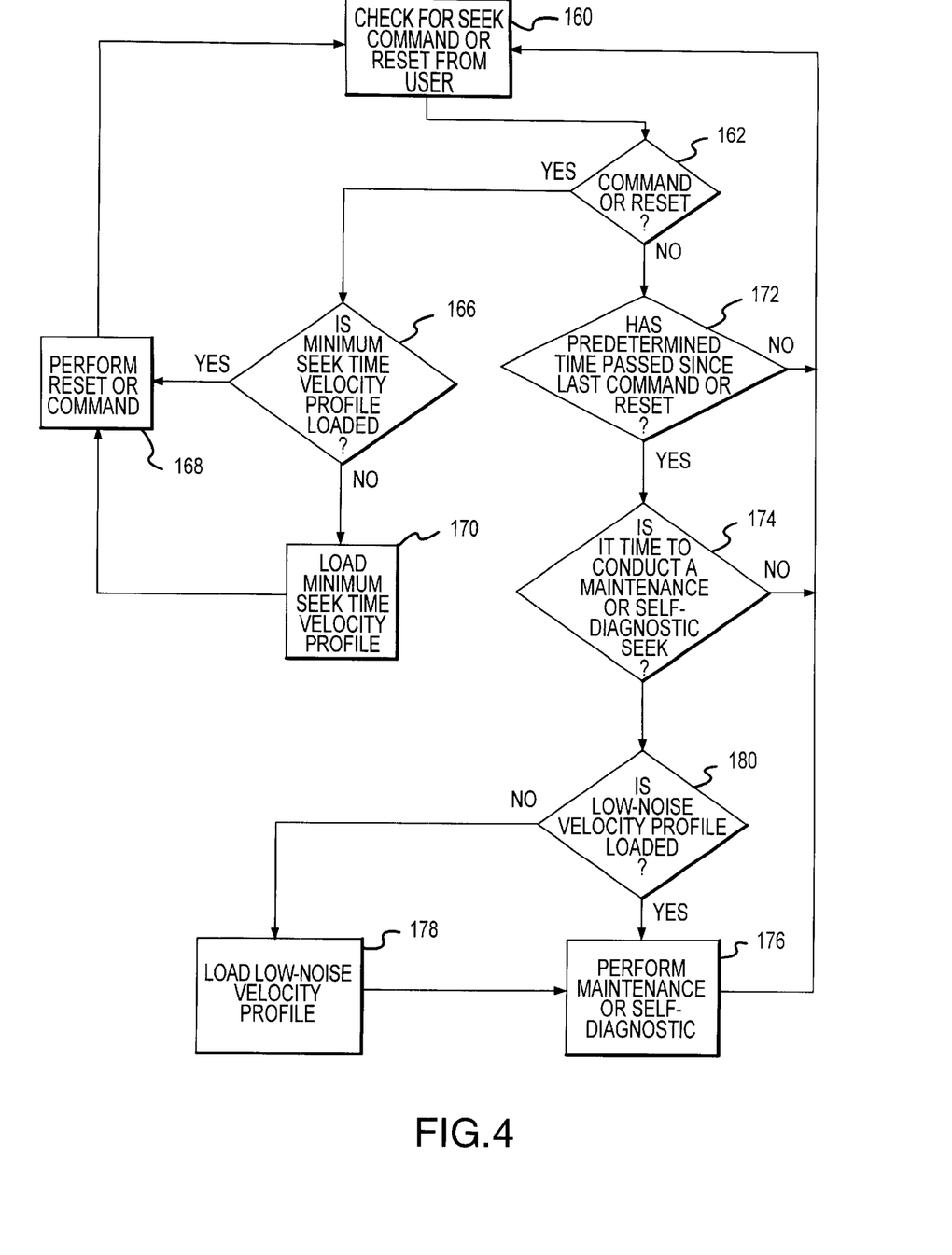
FIG. 4 is a software flow diagram of the preferred embodiment showing the selection of a low-noise velocity profile when the drive is idle.

FIG. 4 presents an exemplary flow diagram of a software routine that may be used by the servo controller for selection of the low-noise velocity profile for seeks by the disc drive servo control system such as during routine housekeeping operations in accordance with the invention. A similar routine would be used to position the actuator assembly during idle periods, except that rather than a low noise velocity profile being selected, a set of low noise positions is selected for placement of the actuator assembly.

The exemplary routine begins in operation 160, where the servo control periodically samples for seek and reset commands from the external environment. Next, control transfers to the query operation 162. In query operation 162 the presence of a seek or reset command is determined. If a seek or reset command is present, the servo controller has determined that the drive 100 is not idle and that the seek or reset should use the minimum seek time velocity profile 136. Control then transfers to query operation 166.

Query operation 166 determines whether the current velocity profile loading into memory is the minimum seek time profile 136. If the current profile in memory is the minimum seek time profile then control transfers to operation 168 to perform the seek or reset after which control transfers back to the original operation 160 to resume sampling for external commands. However, if query operation 166 determines that the current profile in memory is not the minimum seek time profile 136, then the control transfers to operation 170. Operation 170 loads the minimum seek time profile 136 into memory and transfers control to operation 168 to perform the seek or reset after which control transfers back to operation 160 for sampling for external seek commands.

If a seek or reset command is not present in operation 160, the query operation 162 transfers control to query operation 172. Query operation 172 determines if a predetermined period of time has passed since operation 160 has detected a seek or reset command. If the predetermined time has not passed in operation 172, then control returns to the original operation 160. If query operation 172 determines that the predetermined amount of time has passed since the last seek or reset command was detected, then the drive 100 is idle and command transfers to query operation 174.

Query operation 174 determines whether any idle-mode seeks, such as maintenance or self-diagnostic seeks. are necessary. If none are necessary, e.g., scheduled, control returns to operation 160. If the answer is yes, i.e., a maintenance or a self-diagnostic seek is required, then control transfers to query operation 180.

Query operation 180 determines whether the current velocity profile loaded into memory is the low-noise profile 150. If so, then control transfers to operation 176 in which the idle-mode seek and diagnostic is performed and after which control returns to the original operation 160 for sampling for an external command. If query operation 180 determines that the current profile in memory is not the low-noise profile 150, then control transfers to operation 178 where the low-noise profile 150 is loaded into active servo controller memory. Control then transfers to operation 176 and the idle-mode seek is performed. Control then returns to the operation 160.

The software flow diagram shown in FIG. 4 may be supplemented and modified to select the low-noise velocity profile for any or all non-user initiated seek commands, not just an idle-mode seek command as described above.

Figure 5:
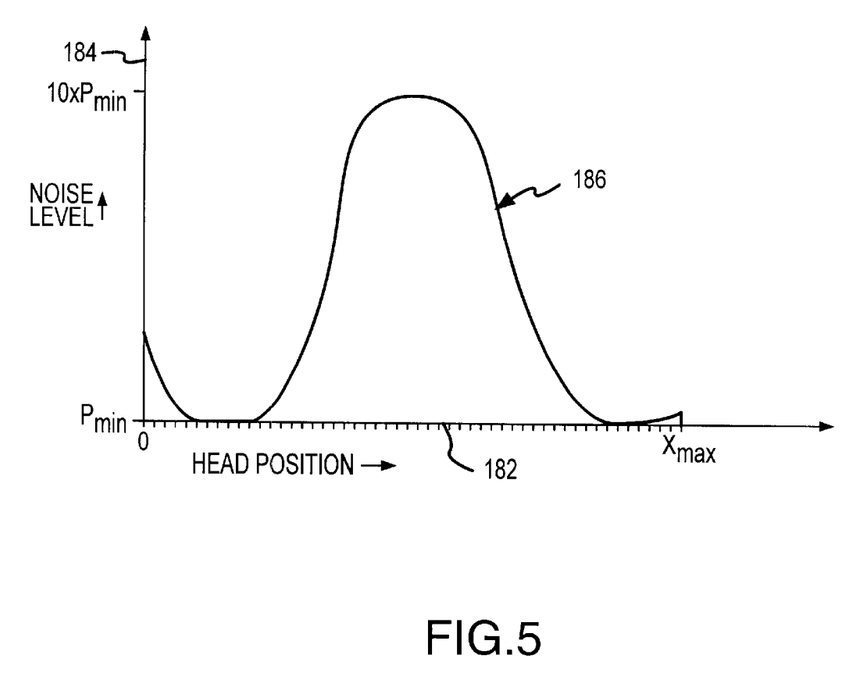
FIG. 5 illustrates a position noise level distribution for a disc drive in accordance with the preferred embodiment of the present invention.

Another aspect of the invention exploits the observation that different actuator positions relative to the rotating disc or discs 108 create differing levels of noise. FIG. 5 shows an experimentally determined exemplary position noise level distribution for a disc drive 100. The actuator assembly position 182 is again plotted on the abscissa and the measured noise level 184 is plotted on the ordinate. This example shows that the noise level 184, experimentally measured as acoustic power, can vary by about a factor of ten between the minimum acoustic level and the maximum acoustic level. Each disc drive 100 is preferably tested using a noise detection transducer (not shown) positioned in the disc drive 100 in the preferred method, although any means of measuring the noise level 184 may be used. During testing, the actuator 110 is sequentially placed in each predetermined position 182, which may or may not correspond to data storage tracks (not shown) on the discs 108, and the noise level 184 at that position 182 is measured.

The noise levels 184 and corresponding positions 182 are preferably stored in the drive 100 for repeated use, although this is not necessary. For example, in one alternate embodiment, the measured noise levels 184 and corresponding positions 182, collectively referred to as the position noise level information, are used to generate a mathematical function 186 that approximates the noise level 184 at each position 182. In this alternative, the mathematical function 186 is subsequently used to reduce audible noise rather than the actual position noise level information.

Figure 6:
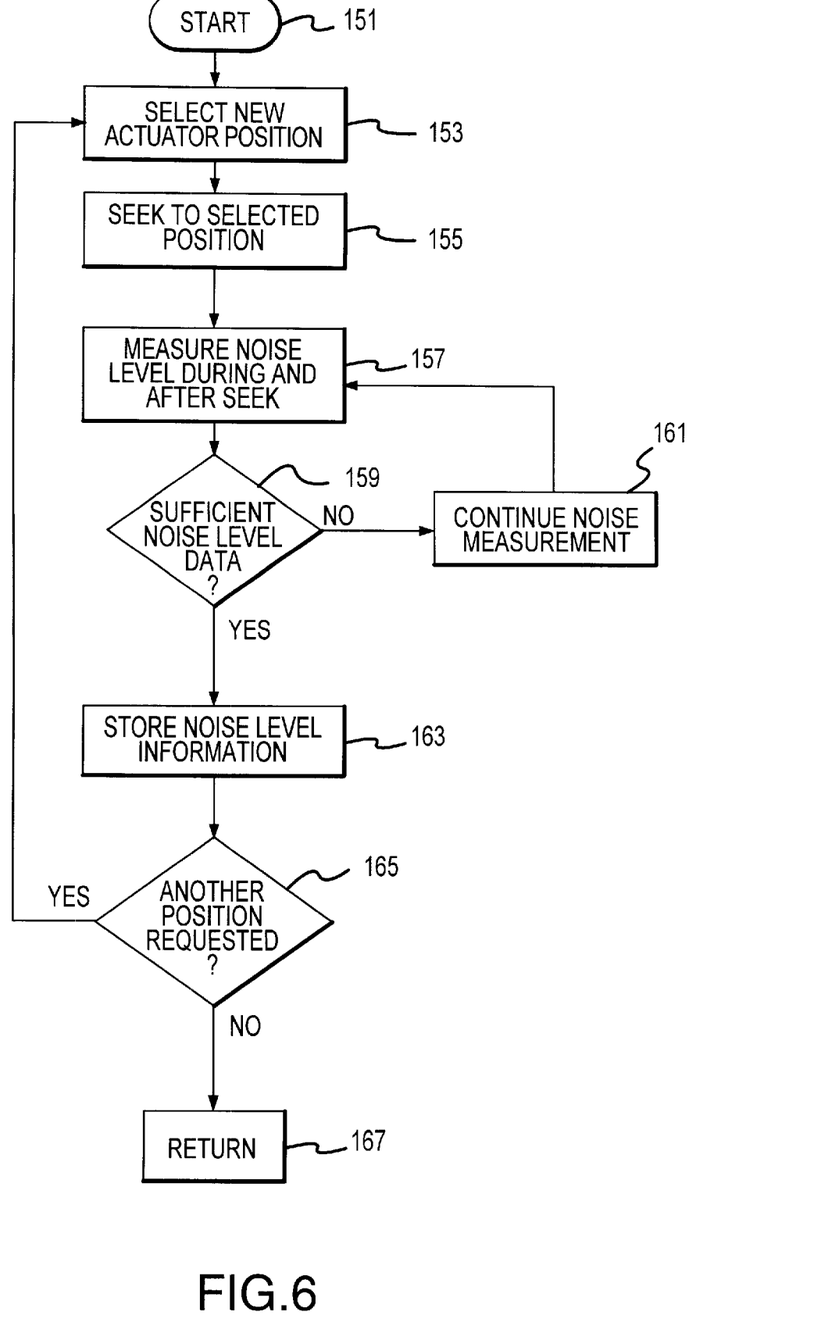
FIG. 6 provides an exemplary flow diagram of a routine to measure the noise levels in a drive.

FIG. 6 provides an exemplary flow diagram of a routine to measure the noise levels 184 in a drive 100. The routine starts in operation 151 where the operability of an acoustic transducer is determined. Control then transfers to operation 153 where a new actuator position is sequentially selected. For the first measurement, the position 182 could correspond to track 000, for example. Control then transfers to operation 155 where the servo controller seeks to the selected position 182. Control then transfers to operation 157 where the noise level at position 182 is measured. This measurement may be in two parts, the first being measurement during the seek and the second, after arriving at the specified position. The data accumulated during the seek could be culled and compiled to determine an optimum velocity profile as discussed above. Control then transfers to query operation 157.

Query operation 157 determines, after a predetermined time period, whether sufficient noise level data has been received. If not, control transfers to operation 161 where the noise level measurement is continued for an additional time period. Control then transfers back to operation 157 and then back to query operation 159. If sufficient noise level data at the position is collected in query operation 159, control then passes to operation 163 where the information is stored for future use. Control then transfers to query operation 165.

Query operation 165 determines whether another position is to be tested for noise level. If so, control transfers back to operation 153 where a new actuator position is selected. Then the sequence of operations 155 through 165 is repeated. If no further positions are to be tested, control transfers to return operation 167. This process of noise level determination is preferably performed during drive manufacture and initial testing. The noise level position data may be stored in the particular drive for use during subsequent drive operation to minimize the noise that the user might hear, especially during idle periods.

There are a number of alternate methods for determining the position noise level information. One alternative to actually measuring the position noise level information directly in each disc drive is to model a parameter such as the noise, vibration, air turbulence or some other parameter that is related to the noise level 184 at each position 182 and use the results of the model to approximate the position noise level information. Another alternative to measuring the position noise level information for each drive 100 is to measure the parameters in a number of drives 100, statistically analyzing the information and creating representative position noise level information profiles that may be used for all like drives 100.

The present invention uses the position noise level information stored in the disc drive 100 to modify the velocity profile 136 used during all disc drive 100 seeks. More particularly, the present invention uses the position noise level information in determining a low-noise velocity profile 150 for use during disc drive idle periods as discussed above. In the preferred embodiment, the position noise level information is preferably used to create a position noise energy generation function $E_{pn}$ which is a function of the noise level ($N_x$) 184 at each position (x) 182, and the time, $t_x$, spent in each position. Because the noise level 184 is itself a function of position 182, once the position noise level information has been determined $E_{pn}$ becomes a function of position 182 and time alone. If, as in the preferred embodiment, the noise level 184 $N_x$ is measured as power in units of joules per second at the point of measurement, then the equation for the energy function is:

$$E_{pn}(x, t) = \sum_{x=x_0}^{x_f} N_x t_x$$

Solving the position noise energy generation function $E_{pn}$ given position noise level information and the time spent in each position results in the total position noise energy generated in joules.

The position noise generation function $E_{pn}$ is summed with a seek noise energy function $E_{sn}$, which describes the noise energy generated during a seek due to the actuator acceleration, movement and deceleration, to create a third, total noise energy function $E_{tn}$. $E_{sn}$ can be derived from a predetermined velocity profile 136 and is a function of the actuator position 182 x, and the time taken to complete the seek t. The resulting total noise function, $E_{tn}$, is $$E_{tn}(x, t) = \sum_{x=x_0}^{x_f} (E_{sn}(x, t) + E_{pn}(x, t))$$

and describes the total noise energy generated from the seeking from the initial actuator position 138 to the final actuator position 140 considering the time spent at each position 182 during the seek. The optimum time necessary to generate the least noise energy during the seek may be found by solving for the minimum $E_{tn}$ for the seek. Depending on the complexity of the seek noise function $E_{sn}$, additional variables may be included to optimize various attributes of the velocity profile to account for the noise levels of the positions moved through during each seek.

The position noise level information is preferably used in selecting actuator positions 182 during idle periods of drive operation. Preferably, a set of actuator positions 182 is selected as representative. For example, this set may be determined based on the position noise level information for the drive, such as excluding the noisiest half or some other portion of the total set of positions 182. The set used in the preferred embodiment is preferably the set of all possible addressable positions 182. After determining the set, any method of selecting a position 182 from the set may be used to position the actuator assembly, such as a mathematically random selection or some type of sequential selection. In the preferred embodiment, a position 182 is chosen from the determined set, i.e. the set of all possible positions 182, by random selection. The corresponding noise level ($N_x$) 184, of that position x 182, is then used to determine the amount of time ($t_x$), that the actuator will stay in that position 182 before it is moved again according to the following formula:

$$t_x = t_0(N_0/N_x)$$

where $t_0$ is a predetermined reference time and $N_0$ is a predetermined reference noise level. As can be seen, the effect of using the formula above is to reduce the amount time spent in the noisier positions 182 (because the term $N_0/N_x$ will be smaller for noisier positions) relative to the amount of time spent in the quieter positions 182. Thus the overall noise generated from the selection of idle-mode actuator positions is reduced, while preventing the furrowing or migration of the lubricant on the surfaces of the discs due to idle-mode actuator placement.

In summary, one aspect of the present invention may be viewed as a method of reducing audible noise in a disc drive (such as 100) having an actuator assembly (such as 110) positioned in working arrangement with one or more discs (such as 108) coupled to a spin motor (such as 106). The method includes the steps of:

(a) rotating the actuator assembly (such as 110) to a plurality of actuator assembly positions (such as in operations 153 and 155);

(b) determining a noise level associated with each actuator assembly position (such as in operations 157 through 165); and (c) controlling operation of the actuator assembly utilizing the noise level and corresponding position information determined in step (b) (such as in operations 160 through 180).

The controlling step (c) may include selecting a set of positions having a noise level less than a predetermined value and positioning the actuator assembly in a position within the set of positions during drive operation (such as is shown in FIG. 5). Step (c) may also include calculating a velocity profile (as in FIG. 3) governing the movement of the actuator assembly utilizing the noise level and corresponding position information determined in step (b).

In particular, the step (b) of determining the noise associated with each position (such as 182) may include determining a noise level associated with each actuator assembly position (such as in operations 151 through 167) for a plurality of disc drives (such as 100), recording the noise level and its corresponding actuator position for each drive, and utilizing the recorded levels in a statistical or mathematical analysis to create an average or representative noise level associated with the set of actuator assembly positions (such as in FIG. 5).

Preferably the invention may be viewed as a method of reducing audible noise caused by the positioning of an actuator assembly in a disc drive during idle periods. In this instance the method has the basic steps of rotating the actuator assembly to a plurality of actuator assembly positions such as in operation 153 and 155, determining a noise level associated with each actuator assembly position (such as in operation 157 through 159), selecting an actuator assembly position (such as in operation 178) based on the noise level for each actuator assembly position, and placing the actuator assembly in the position selected during idle periods (such as in operations 174 through 180). Each noise level and its position may be stored for use by the servo controller (such as in operation 163). Also, a set of actuator positions may be determined with a noise level below a predetermined threshold value and the actuator assembly position selected from within this set of positions. Stated another way, the selection of an actuator idle position may include determining a set of actuator assembly positions based on the noise levels determined above and selecting an actuator position from the set thus determined. The selecting may be done according to a scheme such as sequential positions or by randomly selecting an actuator position from the set. Further, the noise level may be minimized by determining a duration that the actuator assembly will remain in that position based on the noise level and corresponding position information previously determined and placing the actuator assembly in the position selected for the duration determined and then moving the actuator assembly to another position.

Another aspect of the invention may be viewed as a disc drive apparatus (such as 100) that has an actuator assembly (such as 110) adjacent one or more rotating data storage discs (such as 108) coupled to a spin motor (such as 106) that rotates the discs. The actuator assembly (such as 110) is rotatable through a range of positions placing read/write heads (such as 118) at various locations on the one or more discs. A servo controller is coupled to the actuator assembly (such as 110) for controlling the positioning of the actuator assembly. This servo controller utilizes noise level information (such as in operations 151 through 167) in determining an actuator movement control signal. The servo controller preferably utilizes a set of predetermined actuator positions each having a reduced noise level to select an idle condition actuator position for the actuator assembly during drive operation (such as in operations 160 through 180). Preferably the noise level information is a low noise velocity profile (such as is shown in FIG. 3). Also, the servo controller preferably positions the actuator assembly in one of the reduced noise level actuator positions between receipt of externally generated seek commands (such as in operations 160 through 180). The noise level information utilized may be experimentally determined (such as in operations 151 through 167).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method of reducing audible noise in a disc drive having an actuator assembly positioned in working arrangement with one or more discs coupled to a spin motor, the method comprising steps of:

(a) rotating the actuator assembly to a plurality of actuator assembly positions;

(b) determining a noise level associated with each actuator assembly position; and (c) controlling operation of the actuator assembly utilizing the noise level and corresponding position information determined in step (b).

2. The method of claim 1 wherein step (c) comprises steps of:

(c)(i) selecting a set of actuator assembly positions having a noise level less than a predetermined value; and (c)(ii) positioning the actuator assembly in a position in the set of positions during drive operation.

3. The method of claim 1 wherein the step (c) comprises calculating a velocity profile governing movement of the actuator assembly utilizing the noise level and corresponding position information determined in step (b).

4. The method of claim 2 wherein determining step (b) comprises steps of:

(b)(i) determining a noise level associated with each actuator assembly position for a plurality of disc drives;

(b)(ii) recording the noise level and its corresponding actuator position for each drive;

(b)(iii) utilizing the recorded levels in step (b)(ii) in a statistical or mathematical analysis; and (b)(iv) creating an average or representative noise level associated with the set of actuator assembly positions.

5. A method of reducing audible noise caused by positioning of an actuator assembly in a disc drive during idle periods, the method comprising steps of:

(a) rotating the actuator assembly to a plurality of actuator assembly positions;

(b) determining a noise level associated with each actuator assembly position;

(c) selecting an actuator assembly position based on the noise level for each actuator assembly position determined in step (b); and (d) placing the actuator assembly in the position selected in step (c) during idle periods.

6. The method of claim 5 wherein the determining step (b) further comprises a step of storing each noise level and its corresponding actuator position.

7. The method in claim 6 wherein the selecting step (c) further comprises steps of:

(c)(i) determining which actuator assembly position has a noise level below a predetermined value; and (c)(ii) selecting the actuator assembly position determined in step (c)(i).

8. The method in claim 5 wherein the selection of an actuator idle position in step (c) further comprises steps of:

(c)(i) determining a set of actuator assembly positions based on the noise levels determined in step (b); and (c)(ii) selecting an actuator position from the set determined in (c)(i).

9. The method in claim 8 wherein selecting step (c)(ii) comprises randomly selecting an actuator position from the set determined in step (c)(i).

10. The method in claim 5 wherein steps (c) and (d) comprise steps of:

(c)(i) selecting an actuator assembly position;

(c)(ii) determining a duration that the actuator assembly will remain in that position based on the noise level and corresponding position information determined in step (b); and (d) placing the actuator assembly in the position selected in step (c)(i) for the duration determined in step (c)(ii) and then moving the actuator assembly to another position.

11. A disc drive apparatus comprising:

an actuator assembly adjacent one or more rotating data storage discs coupled to a spin motor that rotates the discs, wherein the actuator assembly is rotatable through a range of positions placing read/write heads at various locations on the one or more discs; and a servo controller coupled to the actuator assembly controlling positioning of the actuator assembly, wherein the servo controller derives an actuator movement control signal from noise level information and utilizes a set of predetermined actuator positions each having a reduced noise level to select an idle condition actuator position for the actuator assembly during drive operation.

12. The apparatus of claim 11 wherein a low noise velocity profile is calculated from the noise level information.

13. The apparatus of claim 12 wherein the servo controller positions the actuator assembly in one of the reduced noise level actuator positions between receipt of externally generated seek commands.

14. The apparatus according to claim 11 wherein the noise level information is experimentally determined.

15. A disc drive apparatus having a reduced audible noise level during drive operation comprising:

an actuator assembly adjacent a rotating disc for positioning a read/write head over selected positions over the disc and a servo controller connected to the actuator assembly for controlling the position of the actuator assembly; and means coupled to the servo controller for selecting actuator positions based on predetermined noise level information.

* * * * *